United States Patent [19]

Haas et al.

[11] Patent Number: 4,649,544
[45] Date of Patent: Mar. 10, 1987

[54] ELECTRO-OPTIC HARMONIC CONVERSION TO SWITCH A LASER BEAM OUT OF A CAVITY

[75] Inventors: Roger A. Haas, Pleasanton; Mark A. Henesian, Livermore, both of Calif.

[73] Assignee: The United States of America as represented by the United States Department of Energy, Washington, D.C.

[21] Appl. No.: 662,642

[22] Filed: Oct. 19, 1984

[51] Int. Cl.$^4$ .............................................. H01S 3/10
[52] U.S. Cl. ....................................... 372/22; 372/12; 372/26; 372/27; 372/99; 372/87; 372/105
[58] Field of Search ................... 372/9, 22, 13, 92, 98, 372/27, 37, 99, 106, 12, 105, 87, 26

[56] References Cited

PUBLICATIONS

Weinberg, "Tunable Optical Parametric Amp. and Generators"; Laser Focus, Apr. 1969, p. 35.
Thorne et al., "Liquid Ribbon Elect. for Pockels Cells"; UCRL-13798, Dec. 1977.
Hon, "Electrooptical Compen. for Self-Heating in CD*A During Second-Haronic Generation"; IEEE JQE, vol. QE-12, p. 148, Feb. 1976.
Emmett et al.; UCRL-53344; "The Future Dev. of High-Power Solid State Laser Systems", Nov. 1982.
Yariv; "Intro. to Optical Electronics"; Holt, Rinehart & Winston; 1971, p. 189.
Henesian et al.; "Electro-Optic Harmonic Switch for Large-Aperture Multipass Laser Systems"; *Opt. Lett.*, vol. 9, p. 365, Aug. 1984.
Goldhar et al.; "Electro-Optical Switches with Plasma Electrodes"; *Opt. Lett.*, vol. 9, No. 3, p. 73.
Dinev et al.; "Generation of Tunable UV Radiation in the Range 216-234 nm"; Opt. Comm., vol. 5, No. 5; p. 419.
Pixton; "Tripling YAG Frequency", Laser Focus, Jul. 1978, p. 66.

*Primary Examiner*—Leon Scott, Jr.
*Attorney, Agent, or Firm*—P. Martin Simpson, Jr.; Clifton E. Clouse, Jr.; Judson R. Hightower

[57] ABSTRACT

The invention is a switch to permit a laser beam to escape a laser cavity through the use of an externally applied electric field across a harmonic conversion crystal. Amplification takes place in the laser cavity, and then the laser beam is switched out by the laser light being harmonically converted with dichroic or polarization sensitive elements present to alter the optical path of the harmonically converted laser light. Modulation of the laser beam can also be accomplished by varying the external electric field.

21 Claims, 5 Drawing Figures

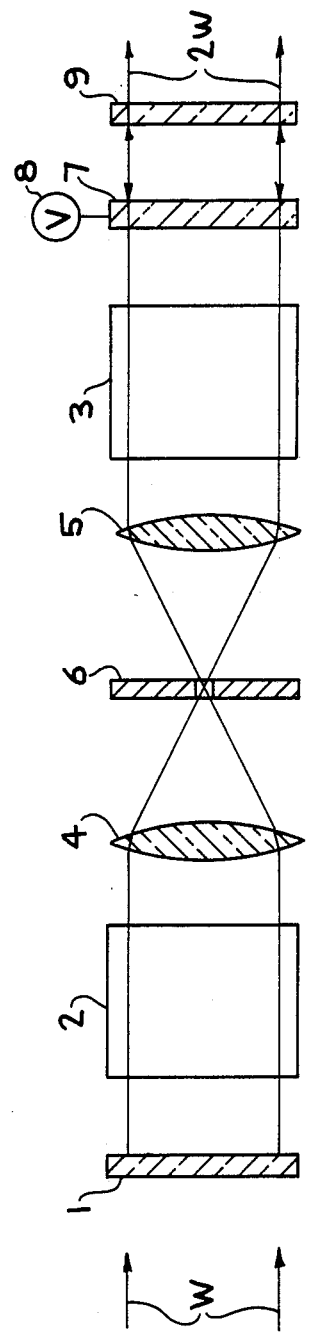
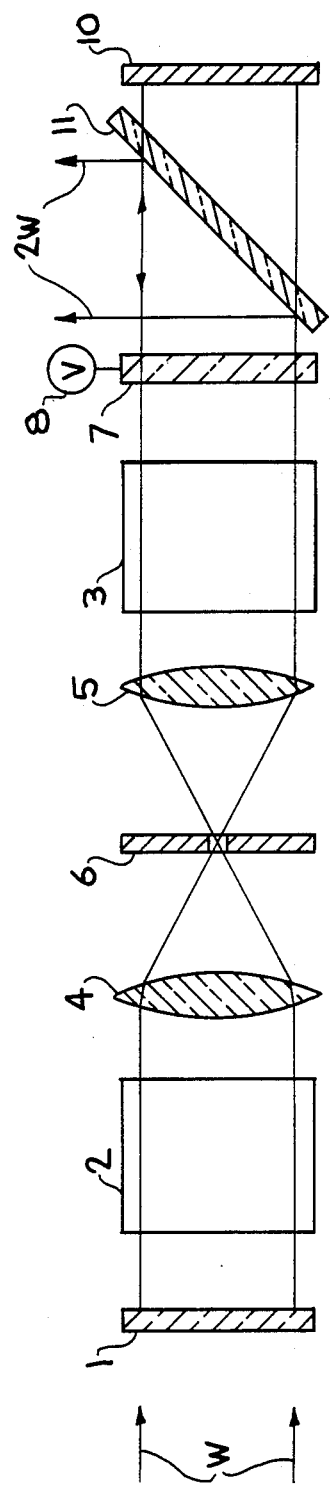
FIG. 1
FIG. 2

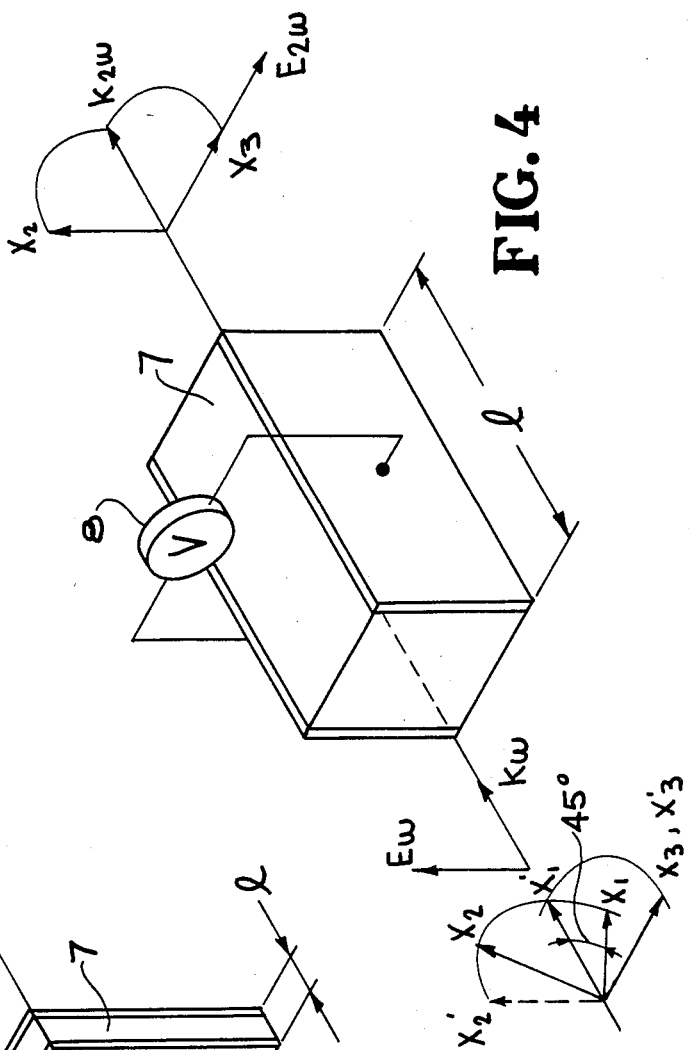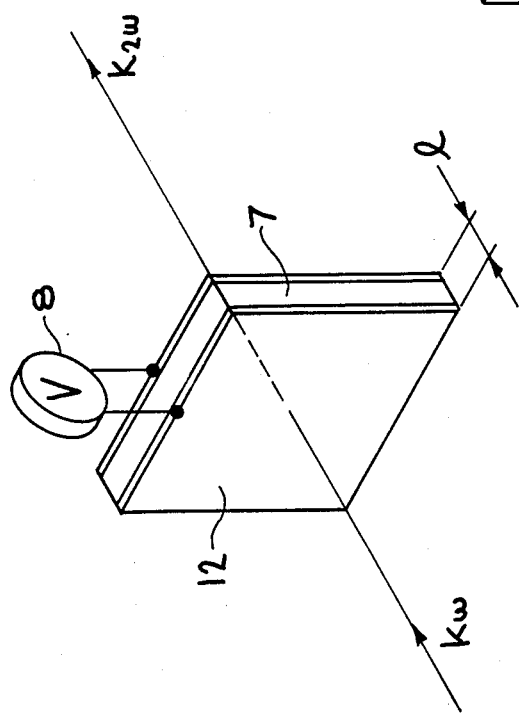
FIG. 3
FIG. 4

ELECTRO-OPTIC HARMONIC CONVERSION TO SWITCH A LASER BEAM OUT OF A CAVITY

The United States Government has rights in this invention pursuant to Contract No. w-7405-ENG-48 between the United States Department of energy and the University of California for operation of the Lawrence Livermore National Laboratory.

BACKGROUND OF THE INVENTION

FIELD OF THE INVENTION

The present invention relates to switching laser beams out of laser cavities, and more particularly, it relates to the use of generating harmonics of the laser beam to accomplish the switching.

when laser light is generated in a laser cavity the problem arises of how to switch the laser light out of the cavity in order to make use of the resulting laser beam in a well known multitude of ways. These uses include range finding, communication, remote sensing, medical surgery, laser fusion applications and many more. The switch-out problem becomes more difficult as the size of the laser aperture grows such as in laser fusion applications. The final amplifier stages of the Nova and Novette lasers at Lawrence Livermore National Laboratory are 46 centimeters with the laser beam expanded to 74 centimeters thereafter. Larger aperture lasers are planned.

In order to cut capital costs and simplify operation by cutting down on the number of optical components and associated equipment needed in large aperture lasers, laser fusion laser designers have decided to add energy to the laser beam by use of multiple passes of the laser beam through the same amplifier. These "multipass" laser system architectures include regenerative oscillators. The regenerative oscillator must employ a switch of some kind to get the laser beam out of the laser cavity. As the aperture size grows, the switching options in the art become more limited. An example of these switch designs is shown in Lawrence Livermore National Laboratory Report No. UCRL-53344 (1982) at pages 32-35. In particular, FIG. 39 (b) and (d) of UCRL-53344 display switchout through the use of a polarization change and through second harmonic conversion, respectively. It can be seen at page 33 that Pockels cells are specifically named for the FIG. 39 (b) switch. with respect to the FIG. 39, the second harmonic conversion takes place due to an intensity being reached in the laser light as it is amplified such that the second harmonic conversion takes place automatically. Angular sequencing is also mentioned.

Electro-optics and harmonic generation are well understood in the art as exemplified in the standard reference by F. Zernike and J. Midwinter, *Applied Nonlinear Optics*, John Wiley & Sons, N.Y., 1973 and the standard textbook by Amnon Yariv *Introduction to Optical Electronics*, Holt, Rinehart and Winston, Inc (New York 1971). Yariv is hereby incorporated by reference. The second harmonic generation discussion starts at page 189 and includes a description of second harmonic generation inside a laser resonator starting at page 194. Zernike and Midwinter is hereby incorporated by reference.

The problems in the art with respect to switching of large aperture laser systems remain difficult. In particular, the second harmonic generation described above in UCRL-53344 is dependent on the level of the fundamental intensity to achieve second harmonic generation conditions. Waiting until an appropriate intensity is reached means that some of the laser light will "leak" through the switching arrangement before other portions. This pre-pulse leakage not only represents a loss of energy but for applications such as laser fusion could result in damaging the target before the main laser pulse arrives. Therefore, a sharper-acting switch is needed.

SUMMARY OF THE INVENTION

It is an object of the invention to provide a switch which will provide a spatially and temporally well defined pulse with little pre-pulse.

Another object is to provide a switch for use on large aperture lasers.

A further object is to utilize harmonic generation to switch a laser beam out of a laser cavity with little pre-pulse.

In brief, the invention relates to switching a laser beam out of a laser cavity through injecting a laser pulse into the laser cavity, amplifying the laser pulse until a desired laser light energy is reached, providing an electric field through a harmonic conversion crystal, causing the crystal to harmonically convert the laser beam to a different frequency by use of the electric field and permitting the harmonically converted laser beam to escape the cavity in a predetermined manner.

Additional objects, advantages and novel features of the invention will be set forth in part in the description which follows, and in part will become apparent to those skilled in the art upon examination of tne following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate an embodiment of the invention and, together with the description, serve to explain the principles of the invention.

FIG. 1 shows a cross-sectional view of one embodiment of the invention where the harmonically converted laser beam passes through a dichroic end mirror of the laser cavity.

FIG. 2 shows an alternate embodiment of the invention in cross section where the harmonically converted laser beam is reflected out of the laser cavity due to changed polarization.

FIG. 3 shows electrodes placed in the path of laser beam propagation.

FIG. 4 shows propagation of laser light through a harmonic conversion crystal to demonstrate the operation of the invention.

DETAILED DESCRIPTION OF THE INVENTION

Figure 5:
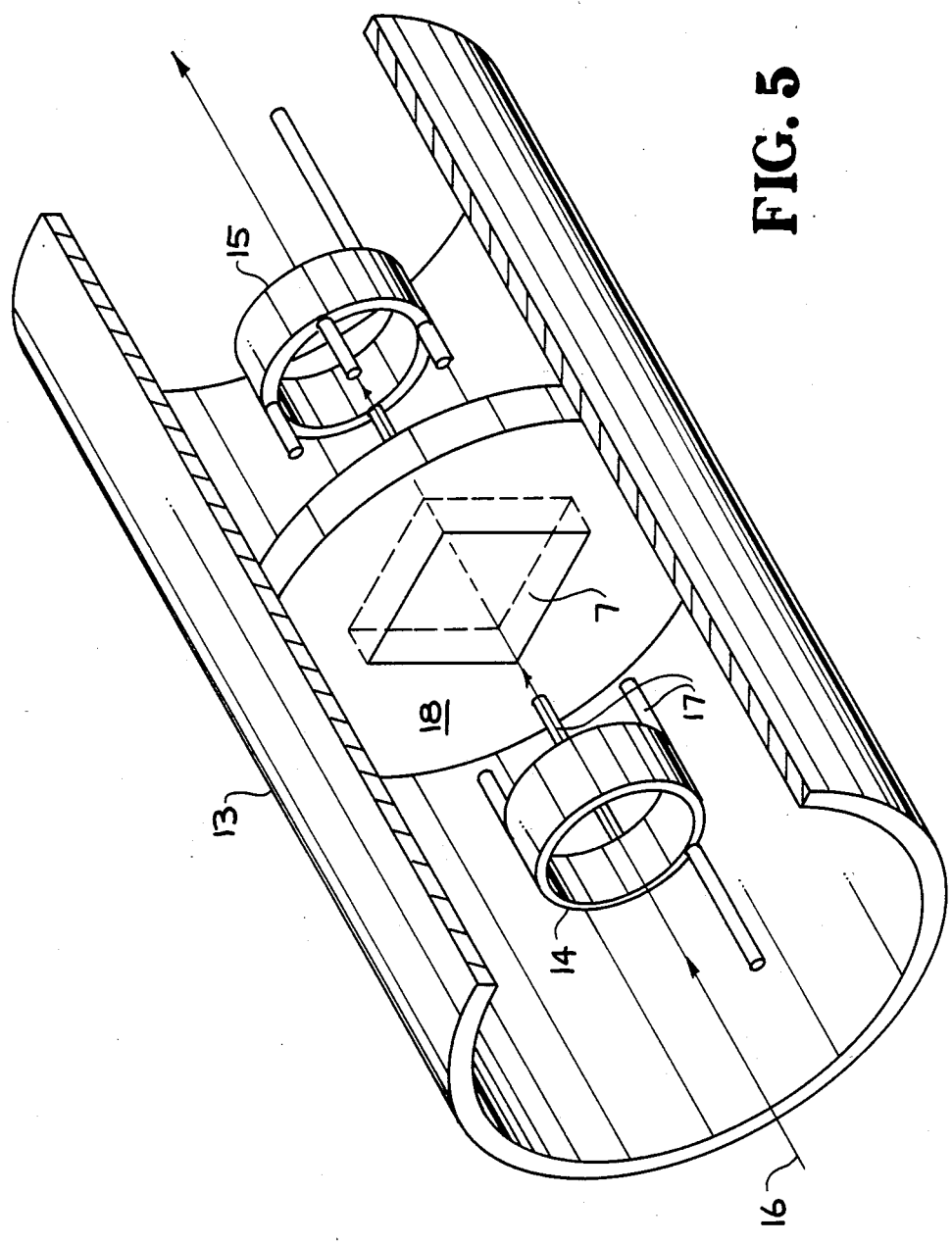
FIG. 5 shows the plasma electrodes for use with the present invention.

Reference will now be made in detail to a preferred embodiment of the invention, an example of which is illustrated in tne accompanying drawings. while the invention will be described in connection with a preferred embodiment, it will be understood that it is not intended to limit the invention to that embodiment. On the contrary, it is intended to cover all alternatives, modifications and equivalents that may be included within the spirit and scope of the inventions as defined by the appended claims.

The present invention relates to switching a laser beam out of a laser cavity. More particularly, the invention uses the harmonic frequency conversion effect in some crystals to permit a laser beam to be amplified at the fundamental frequency and then be frequency converted to a frequency which passes through a dichroic end mirror of the laser cavity. The frequency conversion process is turned on by activating an electric field applied to the crystal. The electric field causes phase matching and consequently harmonic conversion to occur. Frequency doubling is the intended harmonic conversion although frequency tripling or higher harmonics can be used. Due to the perpendicular change in polarization accompanying the frequency doubling in some cases, the laser beam may exit the cavity upon reflection at a polarizer instead of through a dichroic end mirror.

FIG. 1 shows a typical laser cavity according to the present invention. Mirror 1 is partially transmitting, approximately 1%, to allow an input pulse at the fundamental radian frequency $\omega$ to enter the laser cavity. The laser cavity contains one or more amplifiers 2 and 3. The amplifier medium amplifies the fundamental frequency and may be neodymium:glass or another more advanced laser amplifier medium. The laser cavity also contains a spatial filter with the optical components of the cavity arranged so as to be optically relayed as well. Lenses 4 and 5 and spatial filter aperture 6 form the spatial filter and optical relay. A crystal for harmonic conversion of the laser light is crystal 7. In the preferred embodiment this crystal will frequency double, producing the second harmonic frequency $2\omega$. A voltage source 8 is attached to electrodes arranged to place an electric field across the crystal 7. Sample materials for the frequency doubling crystal are KDP, KD*P, and CD*A. Mirror 9 is a dichroic mirror which in the frequency doubling crystal with Nd:glass amplifiers reflects at 1.06 $\mu$m and transmits at 0.53 $\mu$m wavelengths, respectively. FIG. 2 is an alternate embodiment with similar components as FIG. 1, except that instead of dichroic mirror 9 there is a fully reflecting mirror 10. In addition, a polarizer 11 is placed in tne laser cavity optical path to deflect the laser beam at $2\omega$ after frequency conversion and before it passes through an amplifier again. The laser beam at the fundamental frequency $\omega$ is polarized to pass through the polarizer 11 instead of reflecting. Additionally, the electric field between the electrodes can be modulated. This modulation of the electric field produces a similar modulation on the laser beam.

Efficient second harmonic generation in transparent non-centrosymmetric crystals requires that the phase of the fundamental and second harmonic waves be matched. For example, in the region of second harmonic generation where the fundamental beam is not depleted signficantly, the second harmonic conversion efficiency n for a crystal of length l is $$\eta = \delta^2 l^2 I_\omega(o) \frac{\sin^2 (\Delta kl/2)}{4 (\Delta kl/2)^2} \quad (1)$$

where $$\eta = \frac{I_{2\omega}(l)}{I_\omega(o)} \quad (2)$$

The fundamental intensity at the entrance face of the crystal is $I_\omega(o)$ and the second harmonic intensity at the exit face of the crystal is $I_{2\omega}(l)$. The parameter $$\delta = \left( \frac{2}{\epsilon_o c \ n_{2\omega}} \right)^{\frac{1}{2}} \frac{4\pi}{n_\omega \lambda} d_{eff} \quad (3)$$

is the second harmonic coupling coefficient in MKS units, n denotes refractive index and $\lambda$ is the wavelength of the fundamental. The wave vector mismatch between the fundamental and second harmonic electromagnetic waves is $\Delta k$. From Eq. (1) the maximum second harmonic generation occurs when the fundamental and second harmonic beams are phase matched (i.e., $\Delta k=0$). According to Eq. (1), as $\Delta k$ is increased from zero, the second harmonic generation power decreases and becomes zero when $(\Delta kl/2)=\pi$.

In KDP isomorph crystals (negative uniaxial $\bar{4}2$ m point group) the effective nonlinear coefficient $d_{eff}$ is $d_{36} \sin 2\phi \sin \theta$ for type I second harmonic generation and is $-d_{36} \cos 2\phi \sin 2\theta$ for type II second harmonic generation. Here, is the phase-matching angle to the optic axis of the crystal and $\phi$ is the azimutnal angle of the propagation direction to the x crystal axis projected into the x-y crystal plane. According to Eq. (1) type I harmonic generation is thus optimized for propagation in a plane at 45° ($\phi=\pm\pi/4$) to the x-z plane, and type II is optimized for propagation in the x-z plane ($\phi=0$) or y-z plane ($\phi=\pi/2$). In type I harmonic generation the fundamental wave is polarized as an "ordinary" ray and the second harmonic wave propagates as an "extraordinary" ray. In type II harmonic generation, however, the fundamental wave is polarized as both an "ordinary" and "extraordinary" ray, but the second harmonic is still generated as only an "extraordinary" ray. Thus the wave vector mismatch for type I and II processes are respectively:

$$\Delta k_I = \frac{4\pi}{\lambda} (n^e_{2\omega}(\theta) - n_\omega^o), \quad (4)$$

and $$\Delta k_{II} = \frac{4\pi}{\lambda} (n^e_{2\omega}(\theta) - \frac{1}{2}(n_\omega^o + n_\omega^e(\theta))). \quad (5)$$

The extraordinary refractive index at the fundamental and second harmonic frequencies, denoted $n_\omega^e(\theta)$ and $n_{2\omega}^e(\theta)$, are given by $$\frac{1}{n^e(\theta)^2} = \frac{\cos^2\theta}{n_o^2} + \frac{\sin^2\theta}{n_e^2} . \quad (6)$$

Angle-phase matching thus consists of choosing a polar angle $\theta$ in Eqs. (4) and (5), given sufficient crystal birefringence, to achieve zero wave-vector mismatch and maximum conversion efficiency at a given crystal length.

When an electric field is applied along the direction of propagation of the beams, both the "ordinary" and "extraordinary" refractive indices are altered by the linear electro-optic effect. Tne new refractive indices may be calculated from Maxwell's equations for propagation in anisotropic media with the appropriate perturbations to the dielectric tensor, or by considering the refractive index perturbations to the index ellipsoid:

$$n^2 \sum_{i,j} \left[ \frac{\delta_{ij}}{n_i^2} + \Delta\left(\frac{1}{n^2}\right)_{ij} \right] x_i x_j = 1, \quad (7)$$

where i,j sum over directions along the crystal axes; $x_i$ and $x_j$ are direction cosines along the i and j crystal axes of the ordinary and extraordinary polarization vectors, n is tne modified refractive index, and $\delta_{ij}$ is the Kronicker delta. The electro-optic effect induces an index perturbation $$\Delta\left(\frac{1}{n^2}\right)_{ij} = \sum_k r_{ijk} E_k \quad (8)$$

linear in the components of the applied electric field components $E_k$ and tensor elements $r_{ijk}$ of the third-rank electro-optic tensor. For the KDP isomorph crystals, only three electro-optic coefficients are non-zero; $r_{xyz}=r_{63}$, $r_{xzy}=r_{52}$, and $r_{yzx}=r_{41}$; and only two are independent, $r_{41}=r_{52}$, by crystal symmetry. Solving Eq. (7) for an applied electric field E along the propagation direction, FIG. 3, with components $E_x=E \sin \theta \cos \theta$, $E_y=E \sin \theta \sin \theta$, and $E_z=E \cos \theta$, the ordinary index at the fundamental frequency becomes $$\overline{n_\omega^o} = n_\omega^o + \frac{(n_\omega^o)^3}{2} r_{63} E \cos\theta \sin 2\phi, \quad (9)$$

and the extraordinary index at the fundamental frequency becomes $$\overline{n_\omega^e} = n_\omega^e(\theta) - \frac{(n_\omega^e(\theta))^3}{2} [r_{63}\cos^2\theta - 2r_{41}\sin^2\theta] E \cos\theta \sin 2\phi \quad (10)$$

and similarly the extraordinary index at the second harmonic frequency is $$\overline{n_{2\omega}^e} = n_{2\omega}^e(\theta) - \frac{(n_{2\omega}^e(\theta))^3}{2} [r_{63}\cos^2\theta - 2r_{41}\sin^2\theta] E \cos\theta \sin 2\phi \quad (11)$$

Note, that the index perturbation vanishes for both polarizations for propagation at 90° to the optic axis ($\theta = \pi/2$), or for propagation in the x-z plane ($\phi=0$) or y-z plane ($\phi=\pi/2$). Thus, the longitudinal electro-optic effect is inoperative both for non-critical 90° phasematching and "optimized" type II harmonic generation.

A modified form of Type II phasematching that will possess a very useful longitudinal electro-optic effect and still maintain the many advantages of optimized Type II pnasematching can be found that uses an azimuthal angle $\phi$ intermediate between 0 and $\pi/4$ (45°). For the common Type II phasematchable KDP isomorph crystals (KDP, deuterated KDP, ADP, and deuterated ADP) a good compromise between effective crystal nonlinearity and switch-out voltage for harmonic conversion occurs at $\phi=22.5°$. The advantages of the modified Type II harmonic generation scheme over the Type I scheme for electro-optic harmonic conversion include larger crystal nonlinearity, wider angular acceptance of the fundamental beam and optimum harmonic energy conversion over a wider range of fundamental intensities. For example, a modified Type II KDP doubling crystal of length 1.7 cm will provide over 70% energy conversion over the range of fundamental intensities from 0.8 to 6.0 GW/cm²; whereas a Type I KDP doubler of length 1.6 cm will convert over 70% of the fundamental energy over the restricted range from 1.0 to 4.0 GW/cm².

Modified Type II phasematching allows a third longitudinal configuration using two Type II crystals in "quadrature" that provides even greater energy conversion and dynamic range for the electro-optic harmonic conversion process. By "quadrature" is meant that two modified Type II narmonic crystals are used successively in the conversion process where the second crystal oriented with its optic axis in a plane at 90° to the optic axis plane of the first crystal, harmonically converts the fundamental energy remnant from the first crystal. The switch-out voltage must be applied to both crystals simultaneously at the time of switch-out from the multipass laser cavity. As an example of dynamic range, a modified Type II quadrature KDP crystal pair witn crystal lengths of 1.2 and 3.6 cm will provide over 70% energy conversion to the second harmonic frequency over a range of fundamental intensities from 0.2 to 8.0 GW 2. This high degree of dynamic range is essential in a practical multipass laser system for minimum spatial and temporal pulse distortion caused by the switch-out process.

The conversion efficiency, Eq. (1), can be written in terms of an applied voltage V=El across the crystal entrance and exit faces, and "half wave" voltage $V_\pi$ for electro-optic harmonic switching:

$$\eta = \frac{1}{4} \delta^2 l^2 I_\omega(o) \frac{\sin^2(\pi V/V_\pi)}{(\pi V/V_\pi)^2} \quad (12)$$

assuming the crystal is angle-phase matched in the absence of the field. A voltage of $V_\pi$ applied to the crystal detunes it to the first zero of the phase matching curve. Substituting Eqs. (9) to (11) into (4) and (5) the half wave voltages for type I and type II harmonic generation are $$V_\pi^I = \frac{-\lambda}{(n_\omega^o)^3[(1 + \cos^2\theta)r_{63} - 2r_{41}\sin^2\theta]\cos\theta\sin 2\phi} \quad (13)$$

and $$V_\pi^{II} = \frac{\lambda}{\{[(n_\omega^e(\theta))^3/2 - n_{2\omega}^e(\theta)^3][r_{63}\cos^2\theta - 2r_{41}\sin^2\theta] - (n_\omega^o)^3 r_{63}/2\}\cos\theta\sin 2\phi}, \quad (14)$$

respectively, where $\theta$ and $\phi$ are the appropriate phase matching angles. It is important to note that the "half wave" voltages for longitudinal electro-optic switched harmonic conversion are independent of longitudinal or transverse crystal dimensions. Thus, the crystal dimensions can be optimized for the expected range of fundamental intensities and laser beam aperture, independent of the voltage requirements for switcning. For example, if a KDP crystal is used with type I second harmonic generation with a fundamental wavelengtn of $\lambda=1.06$ μm then $V_\pi \simeq 47$ kV. If no longitudinal electric field is applied to the crystal initially and the crystal is detuned to the first zero of the tuning curve (i.e., $\Delta kl/2 = \pi$) then the result of application of a longitudinal voltage $V_\pi$ should be to maximize frequency conversion. If the voltage $V_\pi$ is applied initially, the result of the electric field application is to permit the fundamental frequency laser beam to pass through the crystal with virtually no frequency conversion. In the latter case, the crystal is oriented in the laser cavity for maximum frequency conversion (i.e., $\Delta k = 0$) with no application of electric field.

Table 1 lists the computed nalfwave voltages for a longitudinal Pockels cell, type I second harmonic generation, and modified type II second harmonic

TABLE 1

| Crystal | $r_{63} \times 10^{-12}$ m/v | $\dfrac{r_{41}}{r_{63}}$ | $-V_\pi$ Pockels | $-V_\pi$ SHG I | $-V_\pi$ SHG II ($\phi = 22.5°$) |
|---|---|---|---|---|---|
| KDP | −10.5 | +0.82 | 15 (19) | 47 (79) | >500 |
| KD*P (90%) | −22.7 | +0.48 | 6.9 (7.4) | 16 (18) | 137 (160) |
| ADP | −8.5 | +2.45 | 19 (29) | −89 (−44) | −87 (−73) |
| AD*P (~80%) | −10.3 | +3.88 | 16 (21) | −23 (−19) | −38 (−35) |

( ) - high frequency (clamped) values.

generation (at $\phi = 22.5°$) for KDP, 90% deuterated KD*P, ADP, and approximately 80% deuterated AD*P. The electrooptic coefficients listed in the table are "unclamped" (i.e. low frequency) values from the literature. Notice, that because of the wide variation in the ratio $r_{41}/r_{63}$ among the KDP isomorphs, each material is optimum for a different application. For instance, for a type I second harmonic switcn, KD*P has the lowest halfwave voltage of 16 kV, whereas for a type II switch AD*P with 38 kV is considerably lower than KD*P with 137 kV or ADP with 87 kV. For a type II switch, KDP has a predicted halfwave voltage in excess of 500 kV. For practical implementation in a multipass amplifier, fast pulsed electric fields (<1 μsec) will have to be applied. In this case, as shown in parenthesis in Table 1, the half-wave voltage will change because the "clamped" (i.e. high frequency) electro-optic coefficients for the KDP isomorph crystals are lower at high frequency. Also, in the high conversion regime the harmonic efficiency falls off with wave vector mismatch more rapidly than indicated by the low conversion solution. For instance at high conversion (90%) the optimum wave vector mismatch and the voltage for switchout are reduced by as much as 30%.

Electro-optic harmonic conversion may also be initiated by applying an electric field perpendicular to the direction of propagation of the light beams through the crystal. The crystal CD*A may be used in this manner with 1.06 μm radiation. An isomorph of KDP, CD*A also has a 42m point group symmetry. The second harmonic generation configuration in this case is shown in FIG. 4. The normally degenerate $x_1$ and $x_2$ crystal axes are at 45° with respect to the propagation wave vector $k_\omega$ of the 1.06 μm fundamental beam. As shown in FIG. 4 this beam is polarized in the $x_1x_2$ plane. The 0.53 μm second harmonic beam produced by the nonlinear interaction of the 1.06 μm beam with the crystal is polarized along the $x_3$ or optic axis of the crystal. The effect of applying a short pulsed (10 to 100 ns) electric field E along the $x_3$ direction is to rotate the principal crystal axes $x_1$ and $x_2$ in their plane by 45° to $x_1'$ and $x_2'$. The axis $x_2'$ is then parallel to the electric field $E_\omega$ of the 1.06 μm fundamental beam. The index of refraction seen by the fundamental beam as it passes through the CD*A crystal is then $$n_{107}{}^o = n_\omega{}^o + ((n_{107}{}^o)^3/2)r_{63}E, \quad (14)$$

where $n_\omega{}^o$ is the ordinary refractive index at the fundamental frequency $\omega$ and $r_{63}$ is the appropriate electro-optic coefficient. In this configuration, the applied electric field E has no effect on the 0.53 μm second harmonic generation beam which is polarized with electric field $E_{2\omega}$ along the $x_3$ axis. The index of refraction seen by the second harmonic beam as it passes through the CD*A crystal is $n_{2\omega}{}^e$, the extraordinary refractive index at the second harmonic freouency $2\omega$. Thus, in this case the wave vector mismatch is given by $$\Delta k = (4\pi/\lambda)[(n_{2\omega}{}^e - n_\omega{}^o) - ((n_\omega{}^o)^3/2)r_{63}E]. \quad (15)$$

Again, from Eq. (1) the maximum second harmonic generation occurs when the fundamental and second harmonic beams are phase matched (i.e., $\Delta k = 0$). The corresponding "half wave" voltage for CD*A is then $$V_\pi = \dfrac{\lambda a}{(n_\omega{}^o)^3 r_{63} l} \quad (16)$$

where a is the transverse aperture dimension of the crystal and l is its length. In this case, the electro-optic harmonic conversion switching voltage depends on the crystal dimensions a and l. For example, if the CD*A crystal is 2 cm long by 2 cm wide then the "half wave" voltage is 22 kV.

A preferred crystal configuration for very large apertures is shown in FIG. 3. The electrode material 12 is on the two sides of the crystal in the laser beam path. The reason for moving the electrode material from out of the laser beam path to crystal faces in the beam path is the scaling to very large aperture sizes such as the 2 or 3 meter diameter planned for future megajoule laser projects. The scaling problem can be seen when one considers that the required voltage across the crystal in the transverse FIG. 4 electrode configuration is approximately proportional to the distance between the electrodes, i.e., the transverse crystal dimension a. When a large aperture system is designed, the transverse crystal dimension becomes as large to accommodate the laser beam. Thus, the voltage between the transverse electrodes is large. In the above example for CD*A the switching electric field was approximately 11 kV/cm, so that scaling to a 2 meter aperture size yields $2.2 \times 10^6$ volts. This is a rather large figure for practical applications. On the other hand, with longitudinal electrodes along the crystal distance l in the laser beam path, voltage required between the electrodes is independent of aperture size since the distance l is independent of transverse dimensions. Sample longitudinal voltages are on the order of 16–140 kV as shown in Table 1. As noted in Zernike and Midwinter a large number of crystal classes exhibit electro-optic and nonlinear harmonic conversion effects. All of these crystals may be used in this invention and for some applications certain crystals will be preferred.

Liquid longitudinal electrode materials are made from electrolytes using 2 moles of tetraethyl ammonium fluoroborate or silver perchlorate in acetonitrile or approximately 1 mole silver perchlorate in acetone, acrylonitrile and benzonitrile. Solid electrodes can be used as well. Liquid electrodes are discussed in J. M. Thorne, "'Final Report—Liquid Ribbon Electrodes for Pockels Cells", UCRL-13798.

FIG. 5 shows the preferred embodiment of a plasma electrode for use with the present invention. A gas housing 13 contains the gas to form a plasma electrode. The gas can be a noble gas such as helium, neon or argon at approximately 10 Torr pressure. The ring electrodes 14, up beam, and 15, down beam, have a diameter such that the laser beam 16 will pass through the central hole without touching either ring. There are a plurality of pin projections 17 extending from each ring toward the other ring in order to aid in breakdown of the gas. Between the two rings is the harmonic conversion crystal 7, which as noted above may be KDP. In one specific embodiment, the ring electrode 14 is placed at the appropriate switching voltage (described above) and the down beam electrode 15 is connected to ground. The $2 \times 2 \times 1$ cm Type I KDP crystal is held in place by a holder 18, here made of lucite. The plasma electrode is described and claimed in co-pending U.S. patent application No. 662,641 by M. A. Henesian and J. Goldhar, filed on the same day as this application and assigned to the same assignee. This application is hereby incorporated by reference. As aperture size and laser beam intensity are increased the holder for the harmonic conversion crystal can change, with a mosaic of many crystals being used such as the 3 by 3 array of 1 cm thick KDP crystals used on the Novette laser over an aperture of 74 cm. For more on this see Lawrence Livermore National Laboratory Report UCRL-50021-82, 1982 Laser Program Annual Report at pages 2-5 to 2-9, hereby incorporated by reference.

Therefore, the present invention provides the method and apparatus for harmonic conversion to switch a laser beam out of a laser cavity efficiently and without a pre-pulse.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for using electro-optic harmonic frequency conversion to switch a laser beam out of a laser cavity, comprising:
   providing a laser cavity defining a closed optical path centered about an optical axis running in the closed optical path comprising two end mirrors, at least one amplifier medium, and at least one electro-optic harmonic conversion crystal;
   pumping the at least one amplifier medium;
   injecting a laser pulse into the laser cavity to travel in the closed optical path;
   amplifying the laser pulse until a desired laser light energy is reached;
   applying an electric field across the electro-optic harmonic conversion crystal in an effective amount for substantially converting the desired laser light energy to a harmonic frequency; and
   permitting the desired laser light energy, after being harmonically converted, to be substantially transmitted as a laser beam outside of the laser cavity.

2. The method as in claim 1, wherein the step of permitting the desired laser light energy to be substantially transmitted outside of the laser cavity comprises transmitting the desired laser light energy through a dichroic end mirror of the laser cavity.

3. Tne method as in claim 1, wherein the step of applying an electric field across the electro-optic harmonic conversion crystal is done in a direction substantially parallel to the optical axis.

4. Tne method as in claim 1, wherein the step of applying an electric field across the electro-optic harmonic conversion crystal is done in a direction substantially perpendicular to the optical axis.

5. The method as in claim 1, wherein the step of converting the desired laser light energy to a harmonic frequency utilizes Type I harmonic conversion.

6. The method as in claim 1, wherein the step of converting the desired laser light energy to a harmonic frequency utilizes Type 2 harmonic conversion.

7. The method as in claim 1, wherein the step of converting the desired laser light energy to a harmonic frequency utilizes frequency doubling.

8. The method as in claim 1, wherein the step of converting the desired laser light energy to a harmonic frequency utilizes frequency tripling.

9. Apparatus for using electro-optic harmonic conversion to switch a laser beam out of a laser cavity, comprising:
   a laser cavity forming a closed optical path centered about an optical axis running in the closed optical path bounded by two end mirrors;
   at least one amplifier medium placed in the laser cavity;
   an amplifier pumping means
   an electro-optic harmonic conversion crystal placed in the laser cavity;
   an electric field pulser operatively connected to the electro-optic harmonic conversion crystal to provide a predetermined electric field across the electro-optic harmonic conversion crystal for substantially converting the laser lignt to a harmonic frequency; and
   a discriminator means for permitting harmonically converted laser light to travel in a laser beam out of the laser cavity while permitting unconverted laser light to remain substantially within in the laser cavity.

10. An apparatus as in claim 9, wherein the discriminator means is a dichroic mirror as one of the two end mirrors of the laser cavity.

11. An apparatus as in claim 9, wherein the discriminator means is a polarization sensitive reflector positioned to reflect harmonically converted laser light out of the laser cavity.

12. An apparatus as in claim 9, further including electrodes in physical contact with the electro-optic harmonic conversion crystal and electrically connected to the electric field pulser.

13. An apparatus as in claim 12, wherein the electrodes are on sides of the electro-optic harmonic conversion crystal which are not in the closed optical path.

14. An apparatus as in claim 12, wherein the electrodes are on sides of the electro-optic harmonic conversion crystal which are in the closed optical path.

15. An apparatus as in claim 14, wherein the electrodes are made of a solid material:

16. An apparatus as in claim 14, wherein the electrodes are made of a liquid material.

17. An apparatus as in claim 9, wherein the electro-optic harmonic conversion crystal frequency converts the laser light by Type 1 harmonic conversion.

18. An apparatus as in claim 9, wherein the electro-optic harmonic conversion crystal frequency converts the laser light by Type 2, harmonic conversion.

19. An apparatus as in claim 9, wherein the predetermined electric field is modulated, whereby the laser beam is modulated.

20. An apparatus as in claim 9, wherein the electro-optic harmonic conversion crystal frequency converts the laser light by modified Type 11 harmonic conversion.

21. An apparatus as shown in claim 9, wherein the electro-optic harmonic conversion crystal frequency converts the laser light by modified Type II quadrature.

* * * * *